United States Patent [19]

Schlaikjer

[11] Patent Number: 4,849,310
[45] Date of Patent: Jul. 18, 1989

[54] LITHIUM/BROMINE ENERGY CELL
[75] Inventor: Carl R. Schlaikjer, Concord, Mass.
[73] Assignee: Battery Engineering Inc., Hyde Park, Mass.
[21] Appl. No.: 225,792
[22] Filed: Jul. 29, 1988
[51] Int. Cl.[4] .................. H01M 6/16; H01M 10/40
[52] U.S. Cl. .................................... 429/105; 429/194
[58] Field of Search ............... 429/105, 194, 196, 197

[56] References Cited
PUBLICATIONS
Colin et al., Electrochemistry of Acetyl Chloride. I. Acetylium Chlorides Complexes, J. Electroanal. Chem. Interfacial Electrochem., 59(1), 9–18, 1975.

Primary Examiner—Donald L. Walton
Attorney, Agent, or Firm—Solon B. Kemon

[57] ABSTRACT

A lithium electrochemical power source is shown, adapted for use as a primary and/or secondary cell, wherein a non-aqueous electrolyte is used, the solvent being a $C_2$ to $C_4$ aliphatic acid chloride and the solute being a lithium aluminum halide with an additive selected from the group consisting of bromine and iodine.

13 Claims, 1 Drawing Sheet

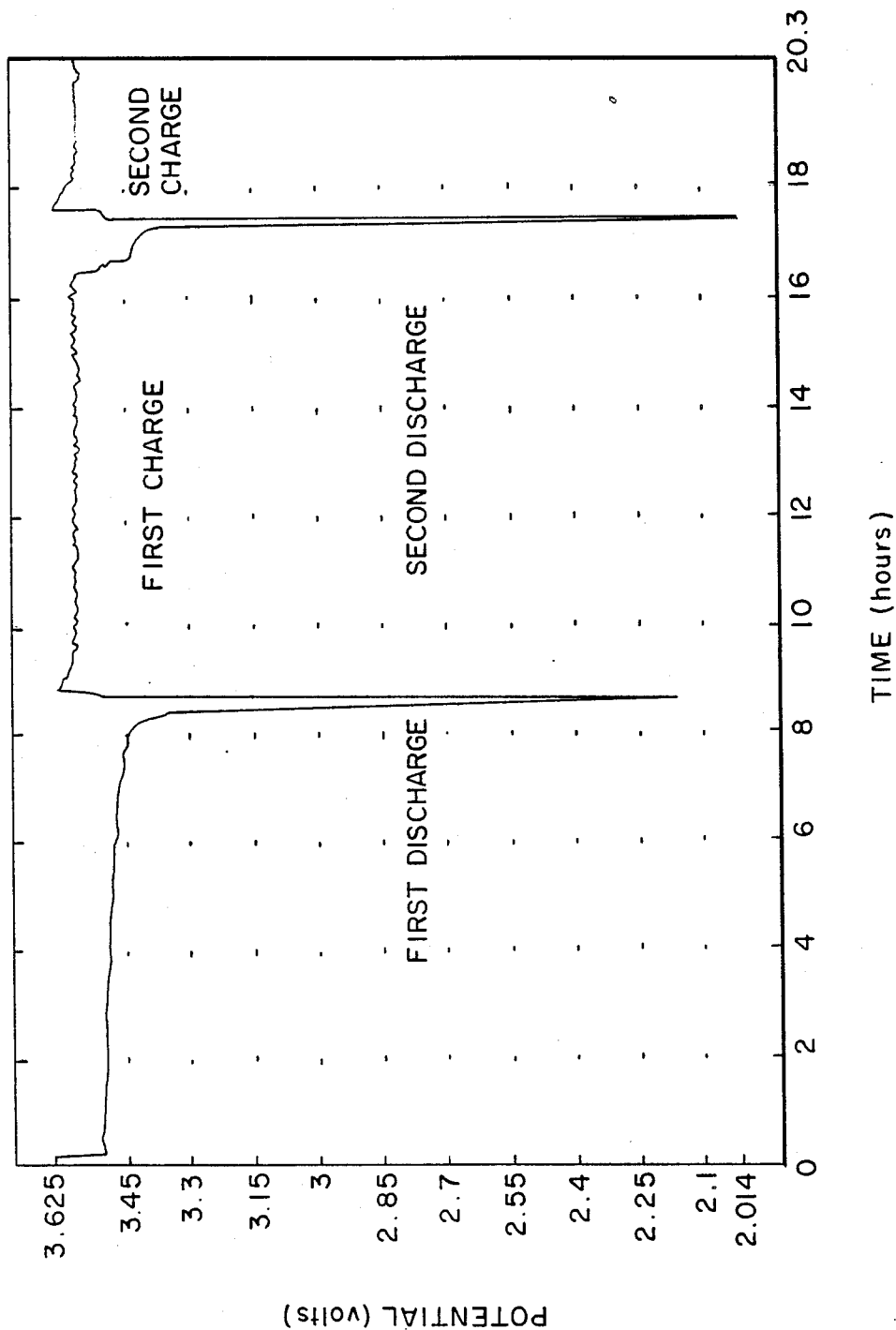

LITHIUM/BROMINE ENERGY CELL

This invention relates to a lithium electrochemical power source and more particularly to a primary and/or secondary cell that has a lithium anode and includes a non-aqueous electrolyte containing an aliphatic acid chloride, a soluble lithium salt, and dissolved elemental bromine.

BACKGROUND

There exists a demand for a small, light electrochemical source of power having a high rate of discharge and a high energy storage capacity. Lithium cells each having a highly reactive lithium anode in combination with a high surface area carbon cathode and making use of one of various electrolyte materials have been developed for this market. The more popular electrolytes include thionyl chloride and sulphur dioxide having a salt such as, for example, lithium tetrachloraluminate dissolved therein.

Typical examples of prior art power sources of this type are shown in the following U. S. Pat. Nos.
  4,352,867 to Catanzarite Oct. 5, 1982
  4,469,763 to Walsh et al Sept. 4, 1984
  4,513,067 to Kuo et al Apr. 23, 1985
  4,643,958 to Thrash Feb. 17, 1987
as well as in the following published articles:
  Journal of Applied Electrochemistry 11 (1981) 563–571
  Journal of the Electrochemical Society March 1982, 451–457
  Journal of the Electrochemical Society Vol. 134, No. 1, pages 37–40.

It has been found, however, that these battery units must be handled cautiously because of a danger of explosion. The article in the Journal of Applied Electrochemistry in its "Introduction" on page 563 states "the explosion hazard of the $Li/SOCl_2$ cells may be related to discharge products such as elemental sulphur and/or intermediates." The article then proceeds to describe an attempt to improve such cells by the addition of BrCl to the electrolyte.

The article in the Journal of the Electrochemical society, on page 451 in the very first paragraph speaks of the "well-known explosion hazard during reversal or charging," see lines 8+. Also, refer to page 455, the first paragraph of the "Discussion," which states that"the commercialization of $Li/SOCl_2$ high rate cells . . . is relatively limited" because of the safety factor.

BRIEF DESCRIPTION OF THIS INVENTION

The disclosure herein covers the preferred construction of a lithium bromine electrochemical power source that makes use of an electrolyte wherein for example a $LiBr.AlCl_3$ salt and elemental bromine are dissolved in chloroacetylchloride. The battery includes a lithium anode and a porous cathode of carbon, graphite, or conductive polymer. Typically the components include a cylindrical casing and a wound cell making use of an inexpensive separator made of a non-woven mat consisting of glass fibres, to provide a much safer and quite inexpensive primary and/or secondary battery.

DRAWING

The curve shown in the drawing illustrates the initial open circuit potential and discharge, the first charge, then a second discharge cycle, then finally the first part of the second charge cycle of an AA size cell containing 1 M $LiBr.AlCl_3$ in chloroacetyl chloride to which had been added 30 volume percent bromine.

DETAILED DESCRIPTION

The battery of this invention is assembled in a stainless steel cylindrical can which for an AA size cell has an outside diameter of ½" and a length of 1⅞". The can is closed with a stainless steel cover that is arc welded with a tungsten electrode in an argon plasma arc to the can with a fluid tight glass to metal compression type feed through seal.

The anode is made in the form of pure lithium foil pressed into a nickel screen with a tab to act as a current collector, and the cathode is made of a high surface area carbon such as acetylene black, Ketjenblack, graphite or a conductive polymer such as poly (paraphenylene), poly (acrylontrile), poly (aniline), or poly (N-methyl pyrrole), supported with the addition of Teflon on a current collector such as a nickel screen. The Li foil anode measures 3 ½" by 1½ and is 0.016" thick and the cathode is 3" long, 1½ wide and is 0.024" thick. The anode and cathode assembly is made by forming a layup with one separator made of an inexpensive non-woven glass fibre mat under the anode and than another separator on top of the other face of the anode with the cathode on top of that separator. Then the layup is rolled into a spiral shape to complete the assembly that is then fitted into the can before the cover is welded on. The cathode screen is welded to the positive terminal and the anode is nickel tabbed to the can.

The preferred electrolyte solution that is formed by dissolving sufficient $LiBr.AlCl_3$ in chloroacetyl chloride tomake a 1.5M solution, then mixing this solution with about 30 volume percent of liquid bromine. The bromine does not cause the salt to precipitate. About 3.5 cm$^3$ of the solution is then filled into the space within the spiral anode-cathode assembly situated in the can, the solution being passed through the hollow compression feed through seal on the cover. This electrolyte was found to be stable by itself and in the presence of the lithium metal at the ambient temperature over a period of several weeks when filled into the can and showed no perceptible increase in pressure nor corrosion of the lithium. It is believed that upon contact with the electrolyte, the lithium forms a thin layer of insolbule lithium bromide on its surface. This salt film does not electrochemically passivate the lithium anode since the film has a sufficiently low electronic conductivity and high ionic conductivity and is semi-permeable only to lithium ions. Alternate solution compositions can include a concentration of bromine of from 5% to 50%, $LiAlCl_4$ or $LiAlBr_4$ in a range of 0.1m to 5m. Iodine may be present in a concentration of from 0.1% to 10%.

Alternate salts are also suggested for use and typical examples are: $LiGaCl_4$, $LiGaBr_4$, $Li_2B_{10}Cl_{10}$, $LiB_{12}Cl_{12}$, $Li_2B_{10}Br_{10}$ and $LiB_{12}Br_{12}$.

The cell discharge reaction is the reversible reduction/oxidation of lithium metal and of bromine, present in the electrolyte as $Br_2$ rather than $Br_3-$, according to the following:

The reaction at the carbon, that is, the positive electrode, is as follows:

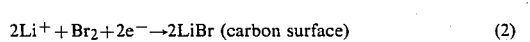

In the electrolyte for the cell of this invention, neither lithium bromide nor lithium tribomide is soluble, so that the lithium bromide film protecting the anode is safe from attack by either the solvent or the free bromine. The concentration of free bromine in the electrolyte may therefore be high, up to at least 40 volume percent, without causing anode corrosion or, in fact, any precipitation of the electrolyte salt, such as lithium tetra chloroaluminate. Unlike the thionyl chloride which is the major component of one type of prior art lithium cells, the aliphatic acid chloride is not easily reduced electrochemically, but acts as an inert diluent for the reversible electrode reactions involving the bromine. Charging may take place either according to the reverse of Equation 2, or according to the following:

$$2AlCl_4^- - 2e^- \rightarrow 2AlCl_3 + Cl_2 \quad (3)$$

$$Cl_2 + 2LiBr \rightarrow 2LiCl + Br_2 \quad (4)$$

$$2AlCl_3 + 2LiCl \rightarrow 2LiAlCl_4 \quad (5)$$

Unlike conventional organic electrolyte rechargeable lithium cells which are damaged by overcharging, the herein described cell is protected against overcharge by the following processes. When the carbon electrode has been fully recharged and cleared of all its lithium bromide, further charging will cause oxidation of the electrolyte according to Equation 3. The aluminum chloride produced will migrate to the lithium electrode and corrode the protective salt film. The extra plated lithium will then react with bromine by an amount stoichiometrically equivalent to the aluminum chloride produced during the overcharge. The protective salt layer on the lithium will then reform. Alternatively, if the electrolyte salt is $LiAlCl_3Br$, Equation 3 will become $$2AlCl_3Br^- - 2e^- \rightarrow 2AlCl_3 + Br_2 \quad (3a).$$

In the following example, an AA size cell as described above was used with the preferred electrolyte. The positive electrode was Ketjenblack with 3 weight percent Teflon. As shown in the curve illustrated in the drawing, the initial open circuit potential of the cell was 3.625 volts, and the cell discharged at about 3.5 volts at an ambient temperature at a rate of 50 mA or about 1mA/cm$^2$ for approximately 8 hours. The cell had been filled to its capacity with the electrolyte before being sealed and did not show any sign of bulging during testing. The steady discharge and subsequent charge and discharge potentials indicated in the curve in the drawing shows that the cell impedance die not change during either the discharge or charge cycles, and that the cell did not short circuit, rupture, or explode. The primary capacity of the size AA cell described above was about 422 mAh and the secondary capacity was about 35mAh.

The above example is merely illustrative of a battery made without a sulphur component such as sulphur dioxide in the organic electrolyte solution so that one known cause of degradation, namely, the reduction of the sulphur component either electrochemically or by bromide ion is thus eliminated. While bromine dissolved in acetyl chloride was found not to be stable, solutions of bromine in either chloroacetyl chloride and in dichloroacetyl chloride were stable. In general, any organic acid chloride that is stable in the presence of bromine, $AlCl_3$, $AlBr_3$ and lithium metal; that is a liquid within a range from -30 C to 80 C; can dissolve $LiAlCl_4$ and $LiAlBr_4$; and is capable of undergoing electrochemical reduction at a potential lower than that of the bromine versus lithium potential or about 3.65 volts, will be found to be a satisfactory solvent. Some examples are partially or fully halogenated (F, Cl, Br) aliphatic acid chlorides, $C_2$ to $C_4$ such as $CH_2ClCOCl$, $CHCl_2COCl$, $CH_3C\ Cl_2COCl$ and $CH_3CHClCHClCOCl$. An iodine solution in an organic acid chloride which meets the above enumerated criteria will also be found to be useful.

The above is a description of the preferred form of my invention and modifications thereof may occur to those skilled in the art that will fall within the scope of the following claims:

I claim:

1. An electrochemical power cell having a lithium metal anode together with a high surface area electronically conductive material as a cathode and a nonaqueous electrolyte comprising a solution that includes an ionizable lithium aluminium halide and an additive selected from the group consisting of bromine and iodine dissolved in a partially or fully halogenated (F,Cl,Br) $C_2$ to $C_4$ aliphatic acid chloride, that is stable in the presence of $Cl_2$, $Br_2$, $I_2$, $AlCl_3$, and Li metal.

2. A cell as in claim 1 wherein said organic acid chloride is chloroacetyl chloride.

3. A cell as in claim 1 wherein said organic acid chloride is dichloroacetyl chloride.

4. A cell as in claim 1 wherein said lithium aluminum halide is lithium tetrachloroaluminate.

5. A cell as in claim 4 wherein said additive is bromine and said lithium aluminum halide forms a complex of lithium bromide and aluminum chloride.

6. A cell as in claim 2 wherein said lithium aluminum halide is lithium tetrachloroaluminate.

7. A cell as in claim 6 wherein said additive is bromine and said lithium aluminum halide forms a complex of lithium bromide and aluminum chloride.

8. A cell as in claim 3 wherein said lithium aluminum halide is lithium tetrachloroaluminate.

9. A cell as in claim 8 wherein said additive is bromine and said lithium aluminum halide forms a complex of lithium bromide and aluminum chloride.

10. A cell as in claim 1 wherein means in the form of non-woven sheet material including glass fibres separates the cathode from the anode.

11. A cell as in claim 1 wherein said high surface area electronically conductive material is selected from the group consisting of poly (paraphenylene), poly (acrylonitrile), poly (aniline), and poly (N-methyl pyrrole).

12. A cell as in claim 1 wherein said high surface area electronically conductive material is selected from a group consisting of acetylene black, a furnace black and graphite.

13. An electrochemical power cell having a lithium metal anode together with a high surface area electronically conductive material as a cathode and a nonaqueous electrolyte comprising a solution that includes at least one lithium salt ingredient selected from the group consisting of $LiGaCl_4$, $LiGaBr_4$, $Li_2B_{10}Cl_{10}$, $Li_2B_{12}Cl_{12}$, $Li_2B_{10}Br_{10}$, and $Li_2B_{12}Br_{12}$, and an additive ingredient selected from the group consisting of bromine and iodine, and all of said selected ingredients being dissolved in a partially or fully halogenated (F, Cl, or Br) $C_2$ to $C_4$ aliphatic acid chloride, that is stable in the presence of $Cl_2$, $Br_2$, $I_2$, and lithium metal.

* * * * *